US010630395B1

(12) United States Patent
Chukka

(10) Patent No.: US 10,630,395 B1
(45) Date of Patent: Apr. 21, 2020

(54) AUTOMATED MITIGATION OF ATMOSPHERIC-BASED INTERFERENCE EVENTS

(71) Applicant: Sprint Communications Company L.P., Overland Park, KS (US)

(72) Inventor: Chaitanya Chukka, Carol Stream, IL (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/234,891

(22) Filed: Dec. 28, 2018

(51) Int. Cl.
*H04W 16/28* (2009.01)
*H04B 15/00* (2006.01)
*H04W 16/18* (2009.01)

(52) U.S. Cl.
CPC ............ *H04B 15/00* (2013.01); *H04W 16/18* (2013.01); *H04W 16/28* (2013.01)

(58) Field of Classification Search
None
See application file for complete search history.

(56) References Cited

U.S. PATENT DOCUMENTS

| | | | |
|---|---|---|---|
| 4,125,893 A | 11/1978 | Hitney et al. | |
| 6,011,820 A | 1/2000 | Rosengren | |
| 6,094,584 A | 7/2000 | Khanna et al. | |
| 6,304,760 B1 * | 10/2001 | Thomson ............. | H04B 17/309 455/503 |
| 7,209,760 B2 * | 4/2007 | Kochanski ............ | H04W 24/00 455/114.2 |
| 8,519,886 B2 * | 8/2013 | Ainsworth .............. | G01S 19/43 342/357.36 |
| 9,271,189 B2 * | 2/2016 | Puthenpura ........... | H04W 28/20 |
| 9,516,513 B2 * | 12/2016 | Sægrov ................ | H01Q 3/2605 |
| 9,729,260 B2 * | 8/2017 | Zhu ...................... | H04J 11/0056 |
| 10,034,181 B1 * | 7/2018 | Somashekar ..... | H04W 28/0236 |
| 10,117,248 B1 * | 10/2018 | Wurtenberger ... | H04W 28/0236 |
| 10,237,770 B2 * | 3/2019 | Kleinbeck ............. | H04W 16/14 |
| 2009/0145999 A1 * | 6/2009 | Porter ...................... | B64B 1/06 244/31 |
| 2012/0314592 A1 | 12/2012 | Behravan et al. | |
| 2013/0322289 A1 | 12/2013 | Zhu et al. | |
| 2014/0056190 A1 | 2/2014 | Qian et al. | |
| 2015/0381221 A1 | 12/2015 | Cyzs et al. | |
| 2016/0116601 A1 | 4/2016 | Horn et al. | |

(Continued)

OTHER PUBLICATIONS

First Action Interview Pre-Interview Communication dated May 2, 2019 in U.S. Appl. No. 16/016,934, 4 pages.

(Continued)

*Primary Examiner* — Tuan A Tran

(57) ABSTRACT

Methods and systems for mitigating the effects of an atmospheric-based interference event on the propagation of a radio frequency (RF) signal are provided. A wireless communication network may determine, based on internal or external inputs, that a meteorologic condition is likely to occur and that the condition is likely to affect the propagation of an RF signal. In response to the determination and prior to the condition occurring, the network may proactively modify characteristics of the base station propagating the RF signal in order to prevent or mitigate the impact of the interference event on the RF signal's propagation.

18 Claims, 8 Drawing Sheets

(56) References Cited

U.S. PATENT DOCUMENTS

2016/0127943 A1* 5/2016 Shaw ................ H04W 28/0231
                                                            370/230
2016/0212669 A1* 7/2016 Davis ................... H01Q 3/2605
2016/0274026 A1  9/2016 Solheim

OTHER PUBLICATIONS

Notice of Allowance dated Jul. 10, 2019 in U.S. Appl. No. 16/016,934, 10 pages.

* cited by examiner

US 10,630,395 B1

AUTOMATED MITIGATION OF ATMOSPHERIC-BASED INTERFERENCE EVENTS

TECHNICAL FIELD

The present invention relates to wireless telecommunications with antennas and radio frequency (RF) signal interference.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, a characteristic of one or more antennas emitting a radio frequency (RF) signal and/or the RF signal, itself, is modified in response to a determination that a meteorologic condition is likely to occur at some time in the future that is likely to affect the propagation of the RF signal. Meteorologic events, such as a tropospheric duct, often affect the propagation of signals by reflecting or refracting them for distances much greater than anticipated or intended. Consequently, a wireless communication device not intended to be in communication with a first base station may receive signals from the first base station, causing interference with respect to signals received by the device from a second base station, with which the device intends to/should communicate. The present disclosure is directed to systems and methods that proactively mitigate telecommunications-performance-impairing interference by using forecasts of meteorologic events to modify antenna and/or RF signal propagation characteristics so that atmospheric-based interference does not occur, is less likely to occur, or is mitigated.

BRIEF DESCRIPTION OF THE DRAWINGS

The present technology is described in detail herein with reference to the drawing figures, which are intended to be exemplary and non-limiting in nature, wherein.

DETAILED DESCRIPTION

Figure 1:
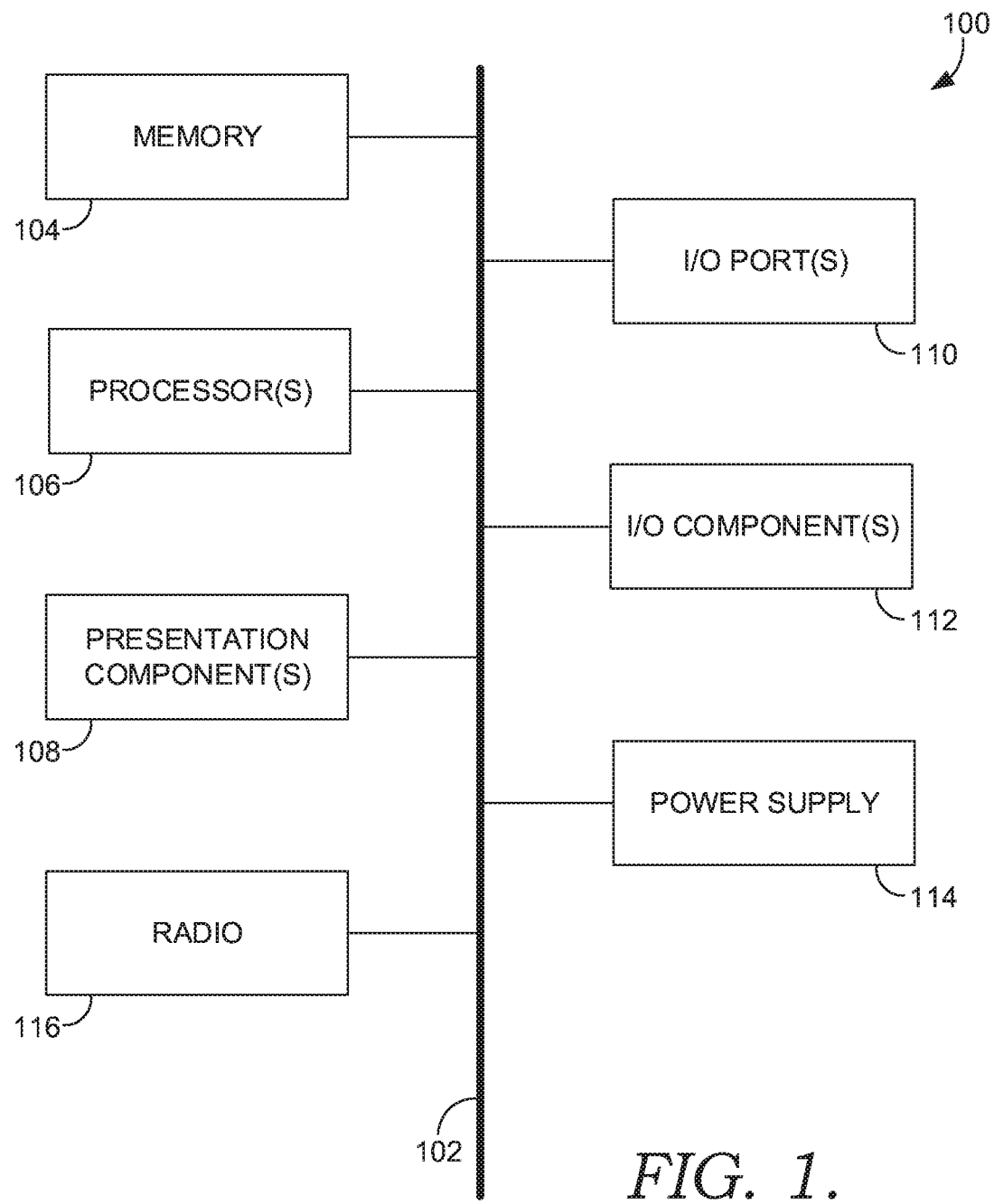
FIG. 1 depicts an exemplary computing environment suitable for use in implementation of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms

| | |
|---|---|
| 3G | Third-Generation Wireless Technology |
| 4G | Fourth-Generation Cellular Communication System |
| CD-ROM | Compact Disk Read Only Memory |
| CDMA | Code Division Multiple Access |
| eNodeB | Evolved Node B |
| GIS | Geographic/Geographical/Geospatial Information System |
| GPRS | General Packet Radio Service |
| GSM | Global System for Mobile communications |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| MD | Mobile Device |
| PC | Personal Computer |
| PCS | Personal Communications Service |
| PDA | Personal Digital Assistant |
| RAM | Random Access Memory |
| RET | Remote Electrical Tilt |
| RF | Radio-Frequency |
| RFI | Radio-Frequency Interference |
| R/N | Relay Node |
| RNR | Reverse Noise Rise |
| ROM | Read Only Memory |
| RSRP | Reference Transmission Receive Power |
| RSRQ | Reference Transmission Receive Quality |
| RSSI | Received Transmission Strength Indicator |
| SINR | Transmission-to-Interference-Plus-Noise Ratio |
| SNR | Transmission-to-noise ratio |
| SON | Self-Organizing Networks |
| TDMA | Time Division Multiple Access |
| UMTS | Universal Mobile Telecommunications Systems |

UMTS Universal Mobile Telecommunications Systems

Further, various technical terms are used throughout this description. An illustrative resource that describes these terms may be found in Newton's Telecom Dictionary, 27th Edition (2012). Additionally, as used in this disclosure, "meteorologic condition" and "meteorologic event" are used interchangeably. A meteorologic condition and/or a meteorologic event refers a naturally-occurring, man-made, or man-caused atmospheric condition that causes or results in a RF signal being propagated differently than intended by an emitting source. For example, when a RF signal is intended to provide wireless service for wireless communication devices within a 5 mile radius, but due to an atmospheric boundary layer, the RF signal is propagated for 50 miles, the atmospheric boundary layer would be considered a meteorologic condition or meteorologic event. Examples of a meteorologic condition or meteorologic event include, but are not limited to, a tropospheric duct, inversion layers, and/or boundary layers over a reflective surface.

A "mobile device," as used herein, is a device that has the capability of using a wireless communications network, and may also be referred to as a "user device," "wireless communication device," or "user equipment (UE)." A mobile device may take on a variety of forms, such as a personal computer (PC), a laptop computer, a tablet, a mobile phone, a personal digital assistant (PDA), a server, or any other device that is capable of communicating with other devices using a wireless communications network. Additionally, embodiments of the present technology may be used with different technologies or standards, including, but not limited to, CDMA 1XA, GPRS, EvDO, TDMA, GSM, WiMax technology, LTE, and/or LTE Advanced, among other technologies and standards.

Embodiments of the technology may be embodied as, among other things, a method, a system, and/or a computer-program product. Accordingly, the embodiments may take the form of a hardware embodiment, or an embodiment combining software and hardware. In one embodiment, the technology may take the form of a computer-program product that includes computer-useable instructions embodied on one or more computer-readable media.

Computer-readable media may include both volatile media, non-volatile media, removable media, non-removable media, and contemplate media readable by a database, a switch, and/or various other network devices. Network switches, routers, and related components are conventional in nature, as are methods of communicating with the same. By way of example, and not limitation, computer-readable media may include computer storage media and/or communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently.

Communications media typically store computer-useable instructions—including data structures and program modules—in a modulated data signal. The term "modulated data signal" refers to a propagated signal that has one or more of its characteristics set or changed to encode information in the signal. Communications media includes any information-delivery media. By way of example, but not limitation, communications media may include wired media, such as a wired network or direct-wired connection, and wireless media such as acoustic, infrared, radio, microwave, spread-spectrum, and other wireless media technologies. Combinations of the above are included within the scope of computer-readable media. Communications media do not include signals per se.

In brief, and at a high level, this disclosure describes, among other things, methods and systems for mitigating the communications performance-impairing effects of an atmospheric-based interference event, such as a meteorological condition, which include the long-distance propagation of a radio frequency (RF) signal beyond the designated geographic area of a particular cell site into other geographic regions of other cell sites. An atmospheric-based meteorologic condition, such as a tropospheric duct or an inversion layer over an at least partially reflective surface, may be likely to affect the propagation of a RF signal. For example, the RF signal may be propagated for great distances by a meteorologic condition, realizing the RF signal in a geographic area not intended by the wireless communication network. Consequently, wireless communication devices attempting to wirelessly communicate with the network in the geographic area realizing the propagated RF signal may experience RF signal interference. The RF signal interference may cause the wireless communication devices to increase battery consumption as the wireless communication devices attempt to communicate with the intended base station in the network. Further, the RF signal interference may reduce throughput of the wireless communication devices.

Other systems and methods are only capable of addressing this RF signal interference problem by reacting subsequent to the occurrence or after the onset of such meteorologic conditions at a particular location, and often require manual or operator-prompted mitigation procedures. The present disclosure determines that the meteorologic condition is likely to occur or onset at a specific time in the future (e.g., forecast) at a particular location, and that a beamform comprising the RF signal is likely to be affected by the forecasted meteorologic condition. In response to these determinations, characteristics of an antenna or base station propagating the beamform comprising the RF signal within the geographic area of the forecasted meteorologic condition may be modified prior to the occurrence or onset of the meteorologic condition at the location of the antenna or base station in order to prevent at least a portion of the beamform from being affected by the meteorologic condition once it occurs. This prevents the negative effects of atmospheric-based interference events, unlike other systems and methods that are limited to reactionary measures alone.

In one exemplary embodiment of the present technology, a system for mitigating the effects of a meteorologic condition on the propagation of a RF signal is provided. The system may comprise a first base station, a first antenna adjusting component, and at least one processor. The first base station comprises at least a first antenna and the first antenna adjusting component may be configured to adjust the characteristic of the first antenna, such as a vertical tilt of the first antenna. The processor may be configured to perform operations that comprise determining that the meteorologic condition is likely to occur in that a first beamform comprising the RF signal, radiated by the first antenna in a first orientation, is likely to be affected by the meteorologic condition, and in response to the determination, automatically adjusting, using the first antenna adjusting component, the first antenna to a second orientation to prevent at least a portion of the first beamform from being affected by the meteorologic condition.

In another exemplary embodiment of the present technology, a method for mitigating the effects of a meteorologic condition on the propagation of the RF signal is provided. The method comprises determining that the meteorologic condition is likely to occur and that a first beamform comprising the RF signal, radiated by a first antenna and a first orientation, is likely to be affected by the meteorologic condition. The method further comprises automatically adjusting, in response to the determination, the first antenna to a second orientation to prevent at least a portion of the beamform from being affected by the meteorologic condition.

In yet another exemplary embodiment of the present technology, one or more computer-readable media having computer executable instructions embodied thereon are provided that, when executed, perform a method for mitigating the effects of a meteorologic condition on the propagation of a RF signal. The method comprises determining that the meteorologic condition is likely to occur and that a beamform comprising the RF signal, radiated by the first antenna in a first orientation, is likely to be affected by the meteorologic condition. The method further comprises, automatically adjusting, in response to the determination, using the first antenna adjusting component, the first antenna to a second orientation to prevent at least a portion of the beamform from being affected by the meteorologic condition.

Referring to the drawings in general, and initially to FIG. 1, an exemplary computing environment 10 suitable for practicing embodiments of the present technology is provided. Computing environment 10 is but one example, and is not intended to suggest any limitation as to the scope of use or functionality of the embodiments discussed herein. Neither should the computing environment 10 be interpreted as having any dependency or requirement relating to any one or a combination of components illustrated. It should be noted that although some components in FIG. 1 are shown in the singular, they may be plural. For example, the computing environment 10 might include multiple processors and/or multiple radios. As shown in FIG. 1, computing environment 10 includes a bus 11 that directly or indirectly couples various components together, including memory 14, processor(s) 16, presentation component(s) 18 (if applicable), radio(s) 20, input/output (I/O) port(s) 22, input/output (I/O) component(s) 24, and power supply 26. More or fewer components are possible and contemplated, including in consolidated or distributed form.

Memory 14 may take the form of memory components described herein. Thus, further elaboration will not be provided here, but it should be noted that memory 14 may include any type of tangible medium that is capable of storing information, such as a database. A database may be any collection of records, data, and/or information. In one embodiment, memory 14 may include a set of embodied computer-executable instructions that, when executed, facilitate various functions or elements disclosed herein. These embodied instructions will variously be referred to as "instructions" or an "application" for short. Processor 16 may actually be multiple processors that receive instructions and process them accordingly. Presentation component 18 may include a display, a speaker, and/or other components that may present information (e.g., a display, a screen, a lamp (LED), a graphical user interface (GUI), and/or even lighted keyboards) through visual, auditory, and/or other tactile cues.

Radio 20 may facilitate communication with a network, and may additionally or alternatively facilitate other types of wireless communications, such as Wi-Fi, WiMAX, LTE, and/or other VoIP communications. In various embodiments, the radio 20 may be configured to support multiple technologies, and/or multiple radios may be configured and utilized to support multiple technologies.

The input/output (I/O) ports 22 may take a variety of forms. Exemplary I/O ports may include a USB jack, a stereo jack, an infrared port, a firewire port, other proprietary communications ports, and the like. Input/output (I/O) components 24 may comprise keyboards, microphones, speakers, touchscreens, and/or any other item usable to directly or indirectly input data into the computing environment 10.

Power supply 26 may include batteries, fuel cells, and/or any other component that may act as a power source to supply power to the computing environment 10 or to other network components, including through one or more electrical connections or couplings. Power supply 26 may be configured to selectively supply power to different components independently and/or concurrently.

Figure 2:
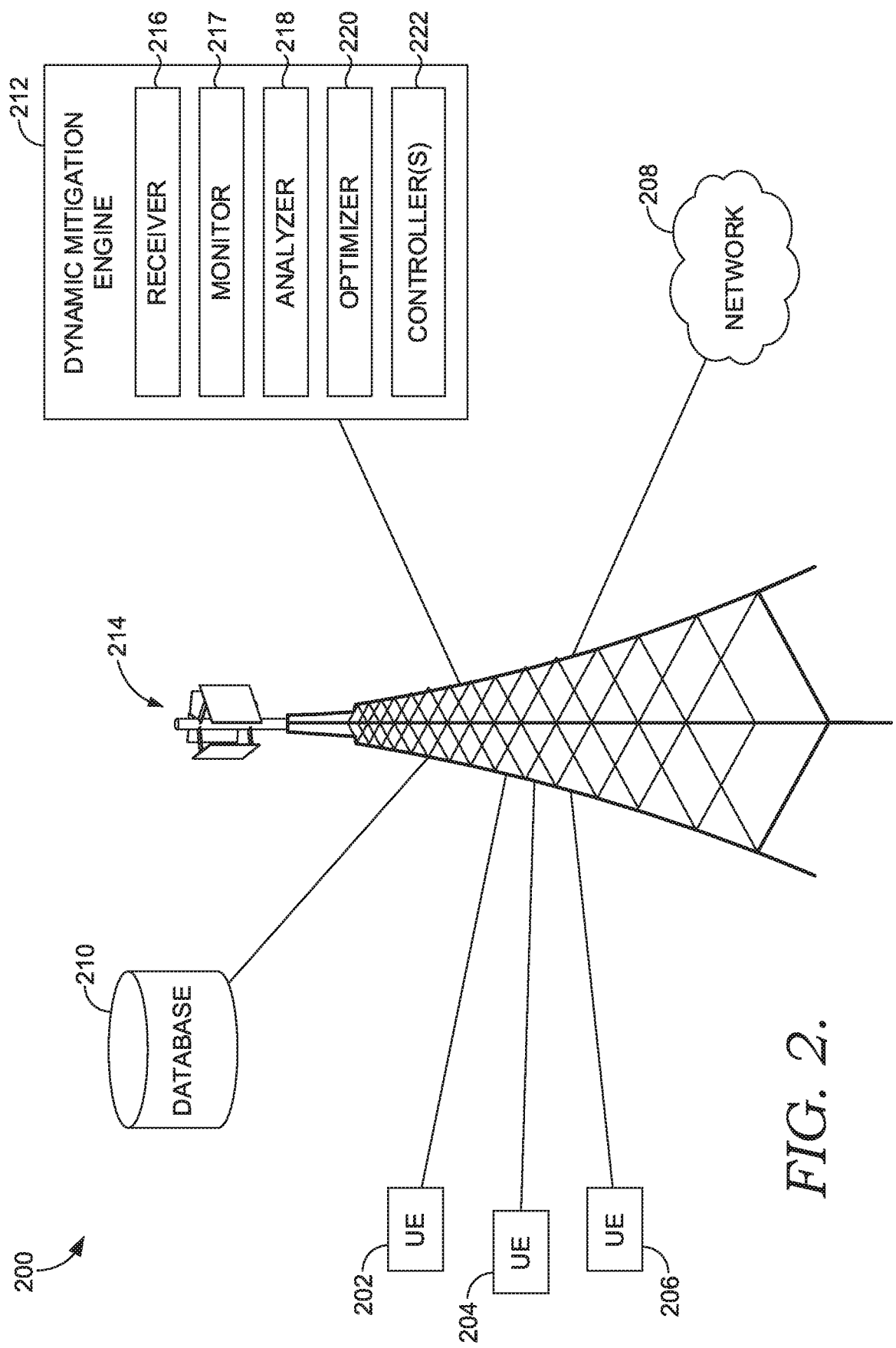
FIG. 2 illustrates a diagram of an exemplary network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes one or more user devices (e.g., user devices 202, 204, and 206), cell site 214, network 208, database 210, and dynamic meteorologic mitigation engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with a public or private network.

In some aspects, the user devices 202, 204, and 206 correspond to computing device 100 in FIG. 1. Thus, a user device may include, for example, a display(s), a power source(s) (e.g., a battery), a data store(s), a speaker(s), memory, a buffer(s), a radio(s) and the like. In some implementations, the user devices 202, 204, and 206 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the user devices 202, 204, and 206 in network environment 200 may optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and data services to any or all of the user devices 202, 204, and 206. For example, network 208 may be associated with a telecommunications provider that provides services (e.g., LTE) to the user devices 202, 204, and 206. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), or a 5G network. The network 208 may also be, in whole or in part, or have characteristics of, a self-optimizing network.

In some implementations, cell site 214 is configured to communicate with the user devices 202, 204, and 206 that are located within the geographical area defined by a transmission range and/or receiving range of the radio antennas of cell site 214. The geographical area may be referred to as the "coverage area" of the cell site or simply the "cell," as used interchangeably hereinafter. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited geographical area. For the purposes of the present disclosure, it may be assumed that it is undesirable and unintended by the network 208 that the cell site 214 provide wireless connectivity to the user devices 202, 204, and 206 when the uses devices 202, 204, and 206 are geographically situated outside of the cell associated with cell site 214. In an exemplary aspect, the cell site 214 comprises a base station that serves at least one sector of the cell associated with the cell site 214, and at least one transmit antenna for propagating a signal from the base station to one or more of the user devices 202, 204, and 206. In other aspects, the cell site 214 may comprise multiple base stations and/or multiple transmit antennas for each of the one or more base stations, any one or more of which may serve at least a portion of the cell. In some aspects, the cell site 214 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more, the radius measured at ground level and extending outward from an antenna at the cell site. In another example, a small cell may correspond to a coverage area having a radius of approximately less than three miles, the radius measured at ground level and extending outward from an antenna at the cell site.

As shown, cell site 214 is in communication with dynamic meteorologic mitigation engine 212, which comprises various components that are utilized, in various implementations, to perform one or more methods for mitigating the effects of a meteorologic condition on the propagation of a RF signal in one or more wireless communications networks. Generally, the dynamic meteorologic mitigation engine 212 may implement various beamforming and/or beamsteering techniques to mitigate communications-impairing RF signal interference at other cell sites, resulting from RF signal propagation caused by a meteorologic condition occurring at the cell site 214 and/or geographically adjacent to the cell site 214. In some implementations, dynamic meteorologic mitigation engine 212 comprises components including a receiver 216, a monitor 217, an analyzer 218, an optimizer 220, and a controller 222. However, in other implementations, more or less components than those shown in FIG. 2 may be utilized to carry out aspects of the invention described herein. The components of dynamic meteorologic mitigation engine 212 may take any one or more of many forms, but specifically may comprise one or more processors and/or servers configured to perform the functions described herein.

The receiver 216 of the dynamic meteorologic mitigation engine 212 is generally responsible for receiving information from various user devices, such as the user devices 202, 204, and 206, when located within the coverage area of cell site 214. Information sent from a user device to the cell site 214 may comprise location information of the user device and channel quality information. Location information may comprise GPS or other satellite location services, terrestrial triangulation, an access point location, or any other means of obtaining coarse or fine location information. The location information may indicate geographic location(s) of one or more of a user device, an antenna, a cell tower, a cell site, and/or a coverage area of a cell site, for example. Channel quality information may indicate the quality of communications between one or more user devices and a particular cell site. For example, channel quality information may quantify how communications are traveling over a particular communication channel quality, thus indicating when communications performance is negatively impacted or impaired. As such, channel quality information may indicate a realized uplink and/or downlink transmission data rate of a cell site and/or each of one or more user devices communicating with the cell site, observed signal-to-interference-plus-noise ratio (SINR) and/or signal strength at the user device(s), or throughput of the connection between the cell site and the user device(s). Location and channel quality information may take into account the user device's capability, such as the number of antennas of the user device and the type of receiver used by the user device for detection. The receiver 216 may also be configured to receive information from cell sites other than cell site 214 or other processors and/or servers relating to an actual or forecasted meteorologic condition. For example, receiver 216 may receive an indication from a database 210 that one or more cell sites other than cell site 214, remote from cell site 214, are presently experiencing or correcting for a meteorologic condition. In another example, the receiver 216 may receive an indication from one or more third party processors and/or servers, such as a forecasting server, that a meteorologic condition is forecasted to occur in a geographic area corresponding to the cell site 214 that could result in an RF signal emitted from cell site 214 propagating and traveling outside the coverage area of the cell site 214, wherein the propagated RF signal may be received by user devices in another coverage area associated with a different cell site.

The monitor 217 is generally responsible for determining a first beamform emitted by the cell site 214. As will be discussed herein, a first beamform may be considered a first beamform in time; that is, the first beamform is emitted by the cell site 214 at a time prior to a time that a second beamform is emitted. As used herein, the term "beamform" may be considered to be synonymous with a radiation pattern at a particular time. Radiation pattern, as used herein, may generally refer to the gain (dBi) of any one or more beamforms. The radiation pattern of any one or more beamforms may be considered to have a three-dimensional (3D) geometry (e.g., size and shape) that may described using an x axis (e.g., horizontal or "H" plane), y axis (e.g., vertical or "E" plane), and z axis. In addition to monitoring the radiation pattern created by the emission of an RF signal from the cell site 214, the monitor 217 may also monitor physical aspects of the cell site 214, such as antenna pan and tilt, or electrical aspects of the RF emitter, such as power supply, phase, and the like. In some aspects, the cell site 214 may comprise an antenna array, such as an active antenna array having a plurality of individually-controlled elements, wherein each element may be independently electronically steered using power and/or phase to control the first or second beamform emitted by the antenna array. In such an example, the monitor 217 may additionally monitor the intended array-formed beamform and/or the actual resultant beamform.

The analyzer 218 is generally responsible for combining the information and/or indications from the receiver 216 with the information monitored by the monitor 217. For example, the analyzer 218 may receive an indication from the receiver 216 that a meteorologic condition is likely to occur at a future time, T+1 (i.e., when T+1>T and/or when T+1>0 and T=0), at the coverage area served by the cell site 214. As used herein, the future time of "T+1" means any one or more units of time in addition to a present time, "T," including, by means of non-limiting examples, one minute, five minutes, one hour, one day, one week, etc. The analyzer 218 may further receive information from the monitor 217 that the first beamform is being emitted at time T. The analyzer 218 may determine whether the information from the receiver 216 and/or the monitor 217 are likely to affect the desired propagation of the signal emitted by the cell site 214. In aspects, this determination may be made by determining whether a likelihood of the forecasted meteorologic condition affecting RF propagation exceeds an action threshold. Returning to the example, the analyzer 218 may determine, based on the information received from the receiver 216, that the first beamform monitored by the monitor 217 is likely to be affected at time T+1 by the forecasted meteorologic condition such that the RF signal is predicted by the analyzer 218 to be propagated beyond the area intended to be covered by the first beamform.

The optimizer 220 is generally responsible for determining a mitigation strategy for mitigating the effect of the meteorologic condition on the propagation of the RF signal emitted by the cell site 214. The optimizer 220 may utilize any combination of mechanical and/or electrical corrective actions to create a second beamform, wherein the second beamform avoids, or has a likelihood of avoiding, the undesired effect(s) of the forecasted meteorologic condition on the propagation of the RF signal. For example, the optimizer 220 may use a mechanical mitigation technique, which, as used herein, refers to a physical change to the emitter(s), array(s), and/or housing corresponding to the cell site 214, such as panning (e.g., yielding a change in the horizontal pattern/H plane), tilting (e.g., yielding a change in the vertical pattern/E plane), or by at least partially obstructing transmissions emitted from one or more antennas (e.g., using a waveguide or adjusting a reflector). The optimizer 220 may also use electrical mitigation techniques, which, as used herein, refer to a non-mechanical adjustment to the signal, emitter(s), or other component or system that results in a change to an emitted beamform. Non-limiting examples of electrical mitigation techniques include modifying the power supply and/or the phase of a signal supplied to each of the one or more antennas of the cell site 214. In aspects, electrical mitigation techniques may be preferred when the cell site 214 comprises an active antenna array system or phased array, such as a gNodeB, MIMO array, or other next generation (e.g., 5G or beyond) array. Returning to the previously discussed example, the optimizer 220 may receive an indication from the analyzer 218 that a forecasted meteorologic condition is likely to result in the propagation of the RF signal inconsistent with the first beamform at time T+1. Generally, the optimizer 220 receives the indication from the analyzer 218 prior to time T−1, or otherwise prior to the forecasted time when it is predicted that the meteorologic condition's occurrence or onset at the cell site 214 may propagate the RF signal of the cell site 214 beyond the coverage area of the cell site 214. Specifically, the analyzer 218 may indicate that the RF signal is likely to be propagated by the forecasted meteorologic condition beyond the range of the first beamform, incidentally realizing the RF signal from the cell site 214 at an undesired user device (not pictured). The optimizer 220 may determine that mechanically or electrically tilting the emitter/signal down (e.g., 5 degrees measured downward relative to an H plane that is parallel to the ground/ground plane), forming a second beamform, is likely to prevent the RF signal from being propagated to the undesired user device located beyond or outside of the coverage area of the cell site 214.

The controller 222 is generally responsible for executing the mitigation strategy determined by the optimizer 220, in embodiments. When the controller 222 is configured to utilize mechanical mitigation techniques, it may provide instructions to a mechanical mitigation device, such as an actuator, to perform a mechanical mitigation technique, such as vertically tilting an element. When the controller is configured to utilize electrical mitigation techniques, it may provide instructions to a power supply, radio, and/or controller, or it may, on its own, control the power and/or phase supplied to each of one or more elements or arrays to perform an electronic mitigation technique.

Figure 3A:
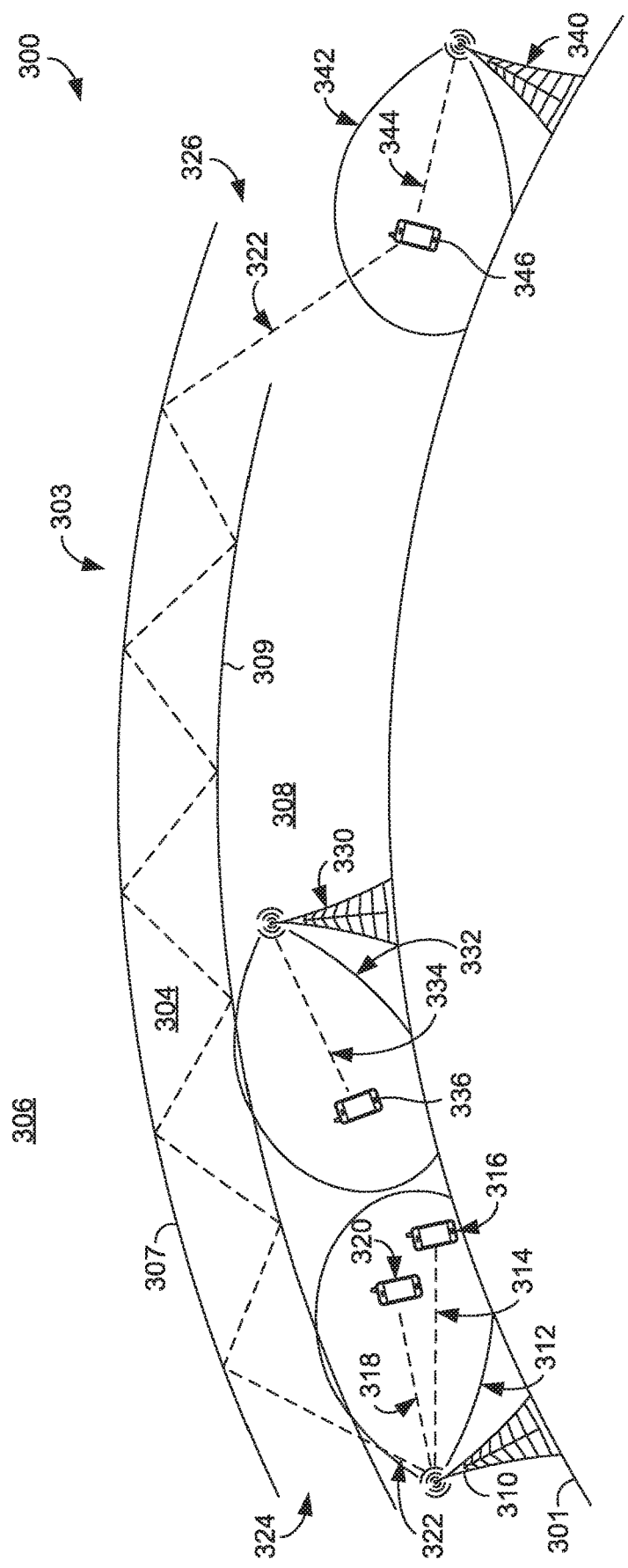
FIGS. 3A-3B each depict a graphical representation of a plurality of base stations and vertical cross sections of beamforms produced by antennas thereon with respect to a tropospheric duct, in accordance with an embodiment of the present technology.
Figure 3B:
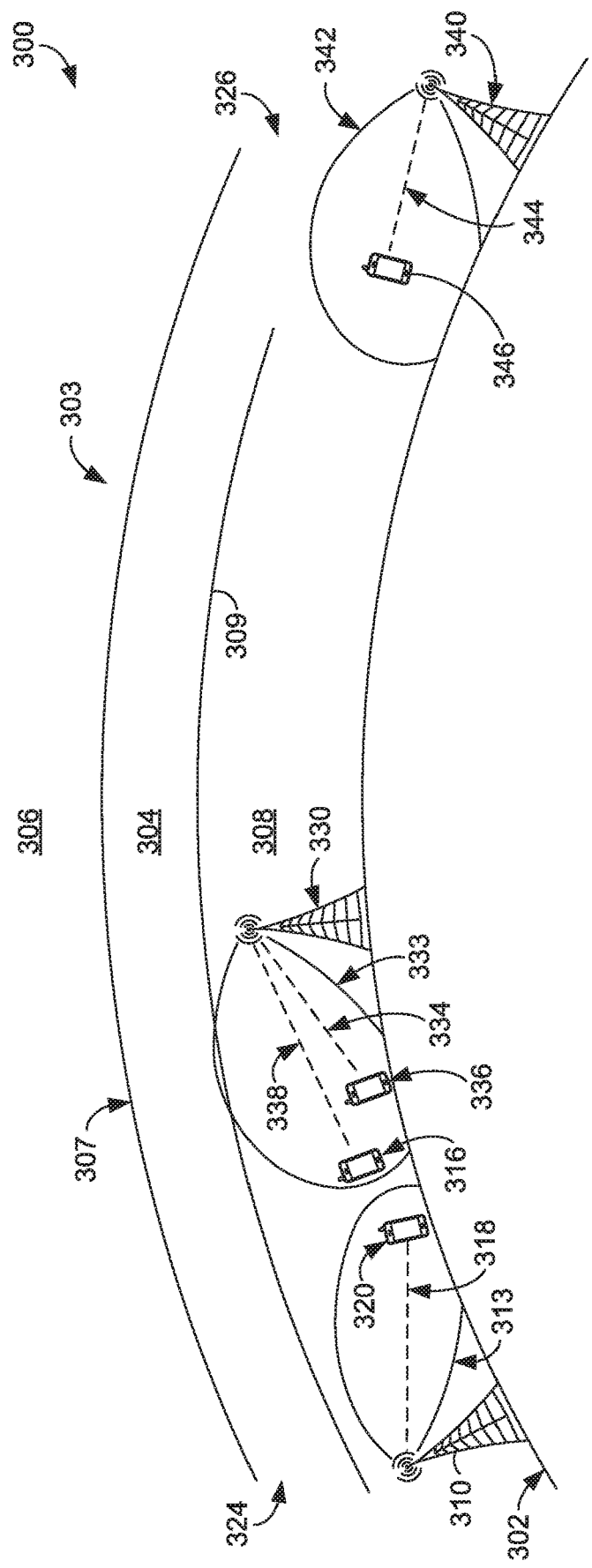

Turning now to FIGS. 3A and 3B, a system 300 for mitigating atmospheric-based interference of RF signal propagation is illustrated. At a high level, the exemplary system 300 comprises at least a first base station in communication with a plurality of user devices. As shown in FIG. 3A, a meteorologic condition is present that is predicted to have an increased likelihood of propagating a RF signal emitted by the first base station beyond a predefined or baseline coverage area of the first base station 310. As will be explained in greater detail, FIG. 3A depicts a technological problem of RF signal interference arising specifically from the implementation of wireless communications networks, wherein the technological problem results from a meteorologic condition's impact on the propagation of an RF signal. In aspects, FIG. 3B depicts one example of how the present disclosure uses mechanical and/or electrical mitigation techniques to technologically solve the technological problem by preventing the propagation from occurring.

FIG. 3A depicts how a meteorologic condition may affect the propagation of an RF signal in the absence of any mitigation techniques. The system 300 comprises a meteorologic condition 303 occurring or having an onset at least a first base station 310, wherein the first base station 310 provides coverage for a plurality of user devices. In aspects shown in exemplary FIG. 3A, the meteorologic condition is a tropospheric duct 303, that is, a first air mass 306 and a third air mass 308 are cooler (e.g., temperature) and/or dryer (e.g., humidity characteristics) than a second air mass 304, wherein the second air mass 304 is disposed between the first air mass 306 and the third air mass 308. Though a tropospheric duct 303 may be formed in several ways, the meteorologic condition is common when an air mass located at a first elevation measured from the earth's surface or the ground level 302 cools faster than another air mass located at a second, higher elevation measured from the ground level 302. Though the boundaries may not be rigidly defined, the tropospheric duct may be said to generally be defined by a first boundary layer 307 separating the first air mass 306 from the second air mass 304 and a second boundary layer 309 separating the second air mass 304 from the third air mass 308. For the purposes of the present disclosure, the tropospheric duct 303 may also be said to define an entrance 324 and an exit 326, wherein the entrance 324 and the exit 326 represent the horizontal extent of the tropospheric duct 303 and are defined with respect to the tropospheric duct 303 and its impact on an RF signal emitted from the first base station 310.

The system 300 comprises at least the first base station 310. The first base station 310 may be said to emit one or more RF signals within a first beamform 312 while one or more emitting antennas is in a first orientation. As used herein, the term "orientation," when discussed with respect to one or more emitting antennas may refer to a physical orientation (angles of the one or more antennas with respect to a reference point, such as the ground, a ground plane, tower, and the like) and/or an electrical orientation (phases and/or amplitudes of the one or more emitted RF signals, and resultant beamforms of the one or more antennas). The first beamform 312 may be said to be designed to serve a plurality of user devices within a first coverage area. For example, as seen in FIG. 3A, the first coverage area may comprise a first user device 320 and a second user device 316. The first base station 310 may be said to propagate the one or more RF signals across the entirety of the first beamform 312. That is, the first user device 320 may communicate with the first base station 310 via a first portion 318 of the first beamform 312 and the second user device 316 may communicate with the first base station 310 via a second portion 314 of the first beamform 312. As used herein, a "portion" of a beam form may refer to a cross-section of the beamform in space, which may be realize as a wireless communication link between an emitter (e.g., base station) and remote user destination (e.g., user device) disposed within the beamform. [ ]. If not mitigated, a third portion 322 of the first beamform 312 may also be emitted such that it enters into the entrance 324 of the tropospheric duct 303. Once the third portion 322 of the first beamform 312 has entered into the tropospheric duct 303, it may be reflected or refracted within the second air mass 304 by the first boundary 307 and/or the second boundary layer 309 until it exits the tropospheric duct 303 at the exit 326. Thus, the third portion 322 of the first beamform 312 may be received by a fourth user device 346, wherein the fourth user device 346 is intended to be served by a fifth beamform 342 emitted by a third base station 340, i.e., the fourth user device 346 is not intended to be served by the first base station 310 because the fourth user device 346 is located outside the baseline coverage area of the first base station 310.

The system 300 may further comprise a second base station 330, which may be said to emit a third beamform 332, a fourth portion 334 of which effectively creates a link between a third user device 336 and the second base station 330. The system 300 is shown in an unmitigated configuration in exemplary FIG. 3A, and one effect of the tropospheric duct 303 is that the third portion 322 of the first beamform 312 is received at the fourth user device 346. However, the fourth user device 346 may also receive a fifth portion 344 of the fifth beamform 342 emitted by the third base station 340. By receiving both the third portion 322 of the first beamform 312 and the fifth portion 344 of the fifth beamform 342, the fourth user device 346 will experience increased interference and/or noise resulting in a decreased SINR, thus negatively impacting the ability of the fourth user device 346 to communicate with the third base station 340. In other words, the third portion 322 of the first beamform 312 causes RF signal interference at the fourth user device 346. The present disclosure is directed to preventing and/or mitigating the RF signal interference resulting from the RF signal propagation caused by the meteorologic condition.

Turning now to FIG. 3B, the system 300 is shown in a configuration for mitigating, reducing, and/or preventing the communications-impairing effects of the tropospheric duct 303, such as RF signal propagation. In aspects, the first base station 310 may receive an indication that the tropospheric duct 303 has a likelihood of occurring at a future time, T+1. The first base station 310 may determine and execute, or may be instructed to execute, mechanical and/or electrical mitigation techniques to prevent any portion, such as the third portion 322, of the first beamform 312 from entering the entrance 324 of the tropospheric duct 303 by automatically adjusting the first base station from a first orientation to a second orientation. In aspects, the mitigation techniques may yield the adaptation of the first beamform 312 in to a second beamform 313 prior to the future time, T+1, when the tropospheric duct 303 is predicted to occur at or near the location of the first base station 310 in a manner that is expected to propagate the RF signal of the first base station 310 beyond a baseline (e.g., in the absence of the meteorologic condition) coverage area. As seen in FIG. 3B, the second beamform 313 does not pass any portion of the emitted one or more signals into the entrance 324 of the tropospheric duct 303, thus avoiding reflection and/or refraction of the RF signal into the tropospheric duct 303 that may have otherwise eventually, and undesirably, reached the fourth user device 346 located outside the baseline coverage area of the first base station 310, and thus preventing the aforementioned negative RF signal interference impacts on the fourth user device's 346 ability to communicate with the third base station 340.

Though not specifically shown in FIG. 3B, each base station, such as the first base station 310, comprises at least one antenna used to transmit an RF signal. The at least one antenna may take many forms, such as a dipole, crossed dipole, monopole, spiral, helix, yagi-uda, or parabolic antenna, or any other antenna for communicating the RF signal from the base station to a user device within the base station's coverage area. In some aspects, the at least one antenna may be a plurality of antennas that are grouped together to form an array or node, such as an eNodeB, NodeB, gNodeB, MIMO array, or the like. In addition to the at least one antenna, each base station may additionally comprise an antenna adjusting component. Though referred to herein in the singular, it is expressly conceived that the antenna adjusting component may adjust more than one antenna or may adjust at least a portion of an array, when present. As discussed earlier, the antenna adjusting component may comprise a mechanical (e.g., an actuator for physically panning, tilting, and/or obstructing the at least one antenna) and/or an electrical means (e.g., adapting the power supply and/or phase of the RF signal supplied to the at least one antenna) for preventing a portion of a beamform, such as the first beamform 312, from being affected by a meteorologic condition, such as the tropospheric duct 303. As discussed herein, a beamform generated by an antenna is "affected" by a meteorologic condition when said meteorologic condition propagates the RF signal of the beamform outside of a baseline coverage area associated with the antenna and/or cell site associated with the antenna. Whether the antenna adjusting component is mechanical, electrical, or a combination, the antenna adjusting component may modify any combination of the horizontal and vertical characteristics of the first beamform 312. For example, the antenna adjusting component may comprise a mechanical adjusting component that may be actuated to physically tilt the at least one antenna, changing the angle of the at least one antenna with respect to ground level 302. The antenna adjusting component may further comprise an electrical adjusting component that uses changes in power and/or phase to propagate a second beamform 313, the second beamform 313 being a vertically tilted adaptation of the first beamform 312 that is designed to avoid, reduce, or prevent RF signals from entering the entrance 324 of the tropospheric duct 303. As shown in FIG. 3B and described further, the geometry of the second beamform 313 is different from the geometry of the first beamform 312.

In order to prevent at least a portion of the first beamform 312 from being affected by the meteorologic condition, the system 300 may determine that a meteorologic condition is likely to occur or onset within a threshold distance of the coverage area of the first base station 310 at a future time T+1, wherein time T is a present time. The system may further determine that at least a portion of the first beamform 312 is likely to be affected by the forecasted meteorologic condition when the meteorologic condition occurs within the threshold distance of the coverage area of the first base station 310, for example. In one instance, a predicted location of the meteorologic condition at T+1 is within a threshold distance of the location of the first base station 310 and/or the coverage area of the first base station 310, and thus, the system 300 may predict that at least one beamform, such as the first beamform 312, of the first base station 310 may overlap with, pass into, or emit RF signals into the tropospheric duct 303. By passing RF signals into the tropospheric duct 303, the system 300 may determine that there is an increased likelihood that the RF signals of the first base station 310 may be propagated through the tropospheric duct 303 and exit the tropospheric duct 303 in a separate and distinct coverage area of a different base station, thus causing RF signal interference for any user devices in the separate and distinct coverage area. Though FIGS. 3A-3B depict the meteorologic condition as a tropospheric duct, the meteorologic condition could be any condition, such as a boundary layer, inversion layer, or a phenomenon, such as fog, that causes the RF signal to propagate inconsistent with the first beamform 312. The system 300 may utilize one or more processors, such as the dynamic meteorologic mitigation engine 212 of FIG. 2, to make said determinations. In some aspects, the system 300 may receive a forecast from an external source that may be used to make said determinations; in other aspects, the system 300 may create the forecast that may be used to make said determinations.

External sources, such as the national weather service, amateur radio operator sites, or other sites may forecast the occurrence of a meteorologic condition (e.g., a tropospheric ducting forecast) at time T+1 in a particular area. Based on the received forecast, the system 300 may determine that the particular area is likely to cause the RF signal to propagate differently than the first beamform 312 because the particular area associated with the meteorology condition at T+1 at least partially overlaps with or corresponds to the coverage area (i.e., which includes the first beamform) of the first base station 310. For example, a received forecast may comprise indications of the geographic location(s), altitude(s), entrance(s), and/or exit(s) of the forecasted meteorologic condition. The system 300 may compare the indications of the received forecast with the known characteristics of the first base station 310 and/or first beamform 312 to determine whether at least a portion of the first beamform 312 is likely to be affected by the meteorologic event (e.g., whether a portion of the first beamform 312 is likely to enter the tropospheric duct), wherein the determination of likeliness is based on the likelihood meeting or exceeding a threshold (e.g., when there is a 80% likelihood of RF signals of a beamform entering into a tropospheric duct and a threshold for taking preventive measures is set at 50%). Based on that information, the system 300 may determine that the meteorological condition is both likely to occur and that the meteorological condition occurrence is likely to affect the propagation of the RF signal of the first beamform 312 due to the first beamform 312 overlapping with the meteorological condition. In response to the determination, any one or more components of the system 300 may instruct the at least one antenna at the first base station 310 to be adjusted, using the first antenna adjusting component, wherein the adjustment of the at least one antenna adapts the first beamform 312 (i.e., determined to be susceptible to the forecasted meteorologic condition) into the second beamform 313 (i.e., designed to avoid the forecasted meteorologic condition at or before onset). For example, the first antenna adjusting component may automatically tilt (e.g., using a mechanical device and/or using an electrical modification to the signal) the at least one antenna at the first base station 310 in order to avoid at least a portion of the second beamform 313 from being affected by the meteorologic condition.

Figure 5:
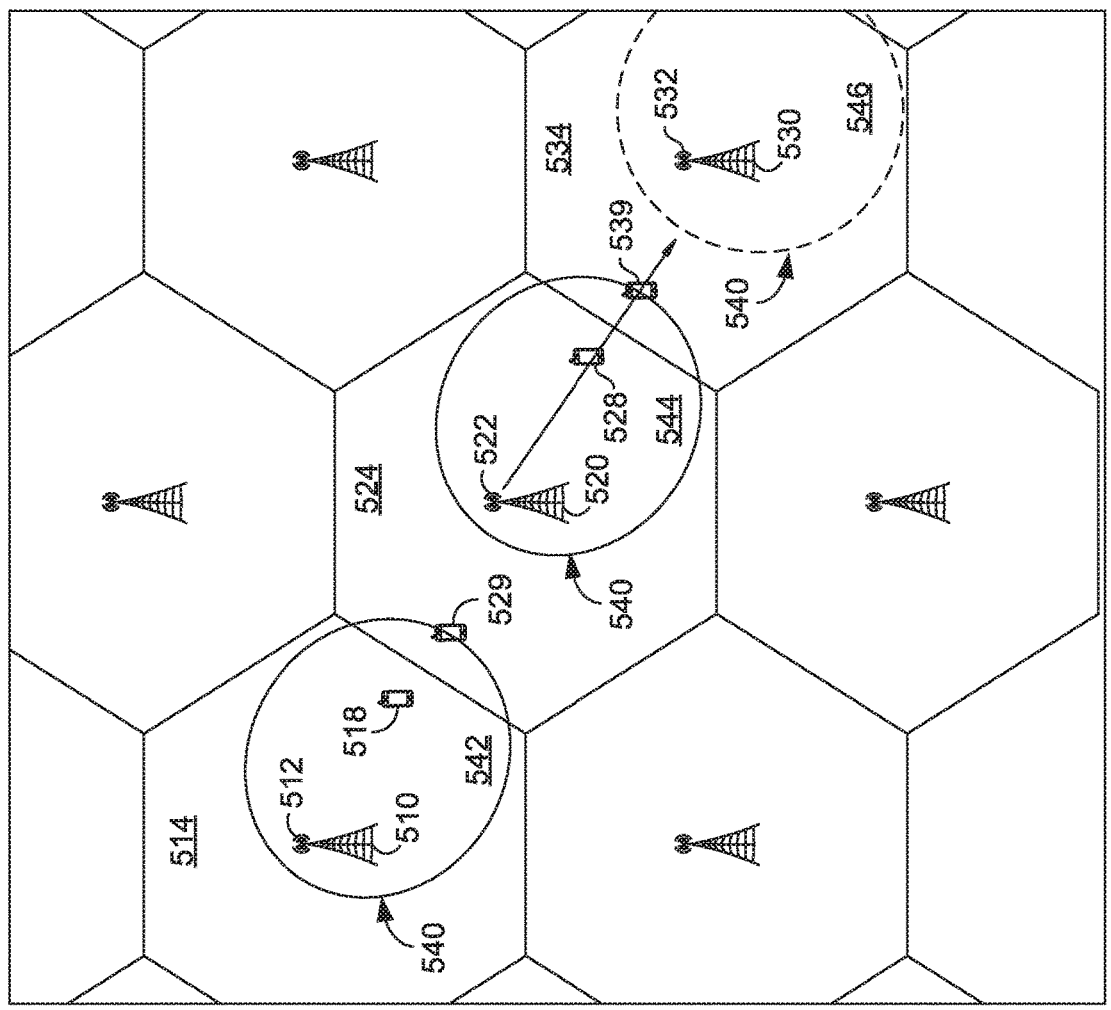
FIG. 5 illustrates a system for forecasting the occurrence of an atmospheric-based interference event, in accordance with an embodiment of the present technology.

The system 300 may additionally or alternatively create its own forecast of a future meteorologic condition. In aspects, the system 300 may comprise one or more observation stations that comprise instruments used to take meteorologic observations (e.g., anemometers, barometers, thermometers, wet bulb, and the like) or may receive observations detached from a forecast from a weather network (e.g., the National Weather Service, Weather Underground®, or the like). The meteorologic observations may be surface observations (i.e., conditions, such as temperature, pressure, humidity, and the like, at or near the earth's surface) and/or atmospheric conditions (i.e., observed conditions such as temperature aloft, pressure aloft, humidity aloft, wind speed aloft, and the like, wherein the term "aloft" refers to a position at some point distant from the earth's surface, such as at altitudes of 50 feet, 1000 feet, 10,000 feet, and the like). Based on the observations, the system 300 may determine that a meteorologic condition is likely to occur at time T+1 in an area and having characteristics that are likely to affect at least a portion of the first beamform 312. In other aspects, the system 300 may utilize observations of an actual meteorologic condition occurring at one location at T (i.e., present time) to determine a forecasted location of the actual meteorologic condition at another location at future time T+1, for example. FIG. 5 represents how the system 300 may make such a determination.

Figure 4A:
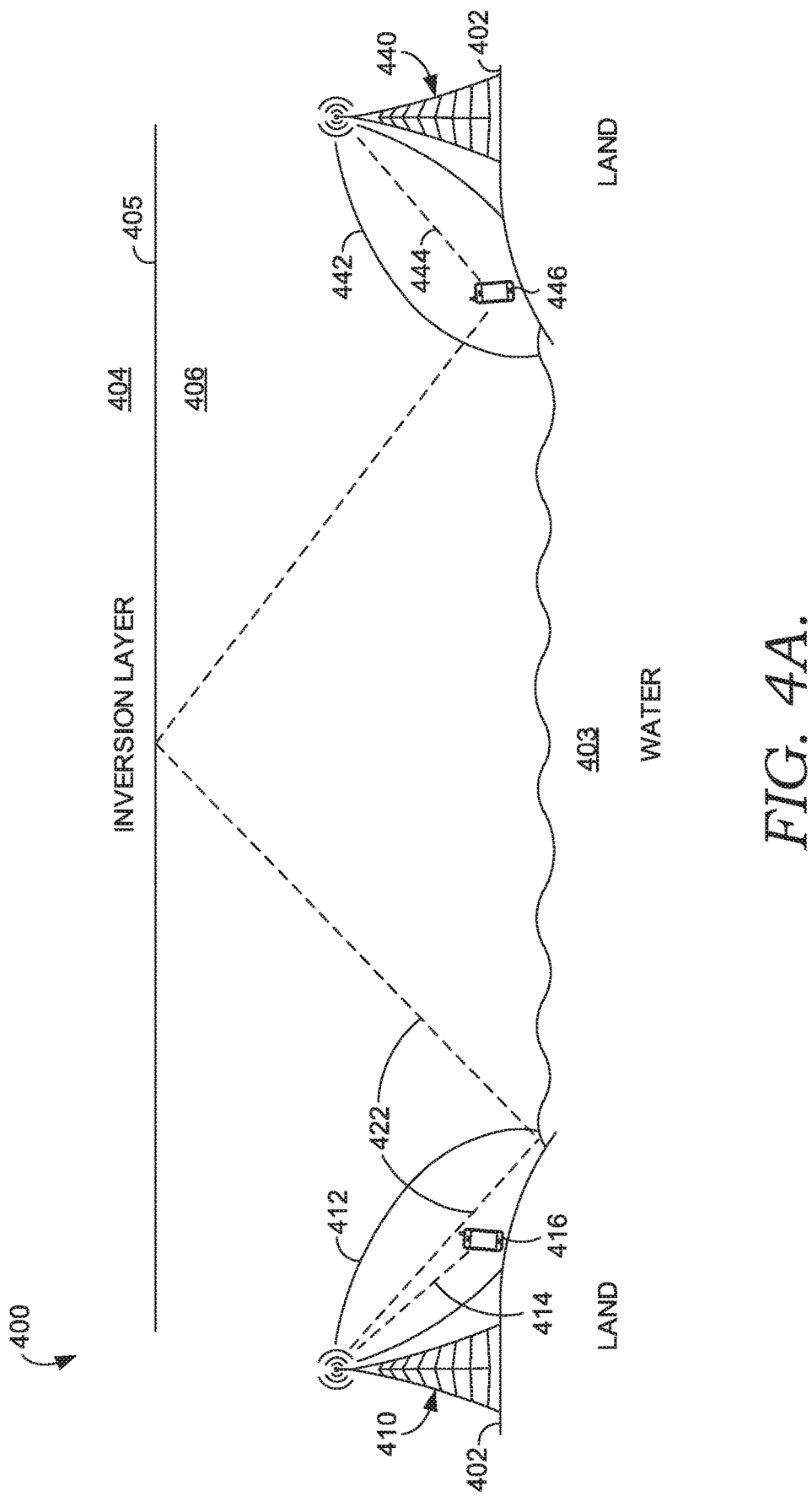
FIGS. 4A-4B each depict a graphical representation of a plurality of base stations and vertical cross sections of being forms produced by antennas thereon with respect to an inversion layer over a relatively reflective surface, in accordance with an embodiment of the present technology.
Figure 4B:
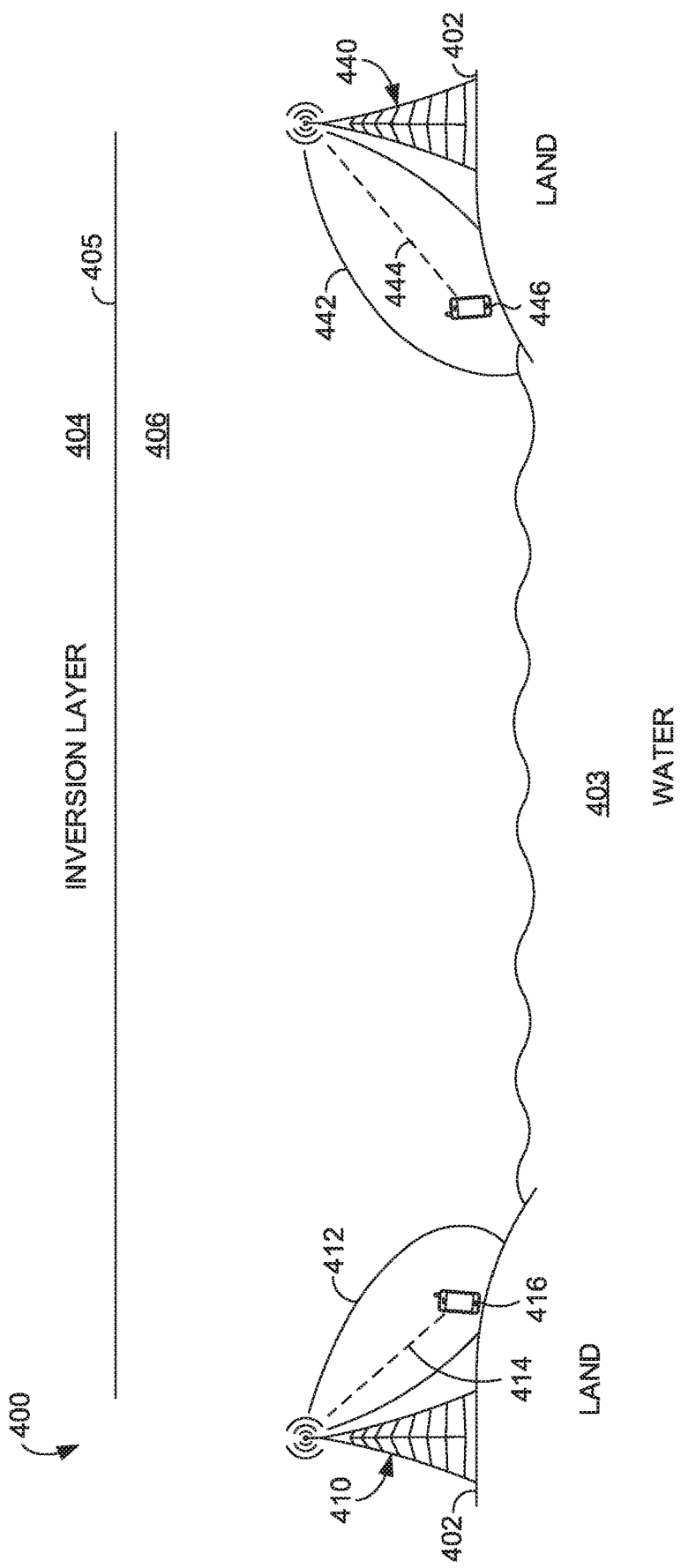

FIG. 5 depicts a network environment 500 which may comprise the system 300 of FIGS. 3A-3B or the system 400 of FIGS. 4A-4B. The network environment 500 represents a wireless communications network, such as a wireless telecommunications network. The network environment 500 may comprise a plurality of cells, each cell equating to a geographic area for which wireless communication is provided from a base station to a user device. Network environment 500 may be said to comprise a first cell 514, a second cell 524, and a third cell 534. The first cell 514 comprises a first base station 510 which emits a first RF signal 512. The first cell 514 also comprises a first user device 518, which is intended to be served by the first base station 510. A second user device 529 lies beyond the first cell 514, in the second cell 524. Because the second user device 529 is geographically located outside of the first cell 514 (i.e., the coverage area of the first base station 510), the first base station 510 generally does not propagate the first RF signal 512 to the second user device 529. However, a meteorologic condition 540 being disposed in a first location 542 at time T−1 causes the first RF signal 512 to be propagated outside of the first cell 514 to the second user device 529 geographically located in the second cell 524. Based on the reception of the first RF signal 512 by the second user device 529, the network environment 500 may determine the presence and extent of the meteorologic condition 540 at time T−1 and use this information to forecast the presence and extent of the meteorologic condition 540 at future times, as further discussed below.

The second cell 524 comprises a second base station 520 which emits a second RF signal 522 to user devices within the second cell 524, such as a third user device 528 and the second user device 529. At time T (i.e., present time), the meteorologic condition 540 is at a second location 544, having moved from the first location 542 since time T−1. The presence of the meteorologic condition 540 at the second location 544 causes the second RF signal 522 to be propagated to a fourth user device 539, wherein the fourth user device 539 is an unintended recipient of the second RF signal 522 because the fourth user device 539 is not geographically disposed in the second cell 524. At this point, any one or more components of the network environment 500, such as the third base station 530, may determine a movement vector based on the meteorologic condition 540 moving from the first location 542 at time T−1 to the second location 544 at time T. Using the movement vector, the network environment 500 may determine that the meteorologic condition 540 is predicted to move in a direction of the movement vector at a speed defined by the movement vector, such that the meteorologic condition 540 is predicted or forecasted to reach or "occur" at a third location 546 at or approximately at time T+1. It is noted that time T+1 may include a period of time or a time range. It may be further be determined by the network environment 500, based on the impact of the meteorologic event 540 on the first RF signal 512 at time T−1, the second RF signal 522 at time T, and/or knowledge of the beamform (e.g., geometry, antenna specifications) associated with the third RF signal 532, that the third RF signal 532 is predicted to be and/or is likely to be affected by the meteorologic condition 540 at time T+1. In response to this determination, any one or more components of the network environment 500 may provide instructions to the third base station 530, or control one or more antenna adjusting components, in order to adapt the third RF signal 532 from a first beamform (e.g., a baseline beamform) to a second beamform (e.g., a modified beamform of a different tilt, steering, geometry) on or before time T+1, wherein the second beamform prevents at least a portion of the third RF signal 532 from being affected by the forecasted meteorologic condition 540 at the third geographic location 546. In aspects, the network environment 500 may comprise a self-optimizing network, which may perform both the forecasting functions and make determinations that at least a portion of a beamform is to be affected by the forecasted meteorologic condition at future time T+1.

Returning now to FIG. 3B, as a result of adjusting, using the first antenna adjusting component, at least one antenna and/or emitted signal of the first base station 310, the second user device 316 may become excluded from the baseline coverage area of the first base station 310, wherein the second user device 316 would have been within the first beamform 312 (shown in FIG. 3A) but is not within the second beamform 313 (shown in FIG. 3B). In other words, the second user device 316 is dropped by coverage as a result of the beamform adjustments implemented. Down tilting an antenna generally reduces the radius of the coverage area provided by that antenna. Specifically, by tilting an element and/or array downward towards ground level 302, the horizontal range of the second beamform 313 is moved and may have a reduced horizontal range relative to the horizontal range of the first beamform 312, at ground level 302. As used herein, the horizontal range refers to a radiation pattern of a beamform as measured at ground level 302, such that the horizontal range is usable to describe a geographic area (length, width) encompassed by said beamform. Accordingly, when the second user device 316 is at or near the edge of the horizontal range of the first beamform 312, the second user device 316 may become excluded by the horizontal range of the second beamform 313, resulting in a coverage gap.

In order to continue to provide coverage for the second user device 316 and prevent the second user device 316 from being dropped out of the network because of its location in the coverage gap, the second base station 330 may perform a capturing procedure wherein it is determined that the coverage gap has been created, it is determined that the third beamform 322 emitted by the second base station 330 is unlikely (i.e., probability below a threshold) to be affected by the meteorologic condition, and automatically adjusting, adapting, and/or modifying the third beamform 322 to become a fourth beamform 333. The fourth beamform 333 may capture and thus provide service to the second user device 316 which was neither covered by the second beamform 313 of the first base station 310 nor the third beamform 332 of the second base station 330, without negatively impacting the existing coverage of the third user device 336 by the fourth beamform 333. By adapting the beamforms at both the first and the second base station before the onset and/or realization of the tropospheric duct 303 at the first base station, the system 300 addresses the technological problems that would have otherwise been experienced by the fourth user device 346 due to the RF signal propagation avoidance adjustments, while also retaining coverage for each of the first user device 320, the second user device 316, and the third user device 336.

After determining that the meteorologic condition is likely to occur and that the propagation of the RF signal emitted by the first base station 310 having a first beamform 312 is likely to be affected by the meteorologic condition, the system 300 may determine when (e.g., date and time) the meteorologic condition is predicted to no longer affect the propagation of the RF signal of the first base station 310.

Using any method described above with respect to forecasting the likely onset of the meteorologic condition, the system 300 may restore the various beamforms to their pre-mitigation settings (e.g., baseline beamform) upon the forecasted conclusion of the meteorologic condition. That is, the second beamform 313 may be restored to the first beamform 312, and in embodiments wherein the capturing procedure was implemented, the fourth beamform 333 may be restored to the third beamform 332.

Turning now to FIG. 4A, a technological problem associated with a system 400 is illustrated. FIGS. 4A-4B depict a meteorologic condition, such as an inversion layer. The meteorologic condition may be defined by a boundary 405 that separates a first air mass 404 from a second air mass 406. Generally speaking, the meteorologic condition depicted in FIG. 4A may be formed when the first air mass 404 has different meteorologic characteristics than the second air mass 406. For example, in some aspects, the meteorologic condition may be an inversion layer, which may be the result of the first air mass 404 being warmer and/or having a higher humidity relative to the second air mass 406. In other aspects, the second air mass 406 may be a fog bank, separated by the boundary 405 from the first air mass 404, wherein the first air mass 404 is different or distinguishable from a fog bank. Regardless of why the meteorologic condition in FIG. 4A is created, the effect is that an RF signal may be reflected and/or refracted off of the boundary 405.

Without the solution of the present disclosure, the system 400 may experience unwanted propagation of at least a portion of an RF signal. The system 400 comprises at least a first base station 410 and a second base station 440. The first base station 410 may be said to transmit a first RF signal according to a first beamform 412, wherein the first beamform 412 comprises at least a first portion 414 of the first RF signal and a second portion 422 of the first RF signal. The first portion 414 of the first RF signal may function as creating a wireless connection with a first user device 416. The second portion 422 of the first RF signal may be reflected or refracted skyward (i.e., towards the sky with respect to the ground 402, a body of water 403, or other similar reference point) by a body of water 403, such as a lake, river, or the like, such that the second portion 422 of the first RF signal propagates beyond the first beamform 412, as shown in FIG. 4A. By further being reflected and/or refracted by the boundary 405, the second portion 422 of the first RF signal may reach a second user device 446. The second user device 446 is positioned within the third beamform 442, wherein the third beamform 442 is the result of the second base station 440's emission of a second RF signal, and wherein the second beamform 442 comprises at least a first portion 444 of the second RF signal, which wirelessly connects the second user device 446 to the second base station 440. When subjected to the unmitigated impact of the meteorologic condition, the second user device 446 is likely to experience a reduced or impairedsignal quality and connection to the second base station 440 due to the arrival of the second portion 422 of the first RF signal that was reflected and/or refracted off the body of water 403 and the boundary 405. In aspects, by receiving both the second portion 422 of the first RF signal and the first portion 444 of the second RF signal, the second user device may experience a decreased SINR. Though the above-discussed impact is the result of reflection and/or refraction between the body of water 403 and the boundary 405, a similar impact (i.e., the second user device 446 receiving a portion of an RF signal from two different base stations) as a result of any undesired propagation (e.g., based on any combination of atmospheric, meteorologic, or surface conditions), is contemplated as being expressly within the realm of the present disclosure.

Turning now to FIG. 4B, the system 400 of the present disclosure may prevent or solve the technological problem shown in exemplary FIG. 4A, by adapting the first beamform 412 to become the second beamform 413. The system 400 may utilize any one or more features of the system 300 to adapt the first beamform 412 to become the second beamform 413, wherein the geometry (e.g., size, shape), tilt, or steering of the second beamform 413 is different from the first beamform 412. Specifically, the system 400 may utilize system, network, or external sources to determine that a meteorologic condition, such as the boundary 405, is predicted to be likely to occur at a specific time or time frame in the future, T+1. Based on the forecasted meteorologic condition, the system 400 may determine that a portion of the first beamform 412 of the first RF signal is likely to be affected by the meteorologic condition, as has been previously discussed. Using the example of FIGS. 4A and 4B, the system 400 may determine that the second portion 422 of the first RF signal is likely to be affected by the boundary 405 because the second portion of the RF signal is predicted to be reflected off the body of water 403 and/or the boundary 405 which propagates the second portion 422 of the first RF signal to the second user device 446. Like system 300, the system 400 may provide instructions to the first base station 410, or any component thereof or thereon, to adapt the first beamform 412 to become the second beamform 413, thus preventing the second portion 422 of the first RF signal from being affected by the forecasted meteorologic condition, such as the boundary 405. Further, the system 400 may incorporate any one or more aspects of the system 300 of FIGS. 3A-3B in order to prevent at least a portion of the first beamform 412 from being affected by the forecasted meteorologic condition. Finally, the system 400 may incorporate the features of system 300 directed to recovering from the second beamform 413 to the first beamform 412 at some time T+2, wherein the meteorologic condition, such as boundary 405, is no longer predicted or determined to affect at least a portion of the first RF signal.

Figure 6:
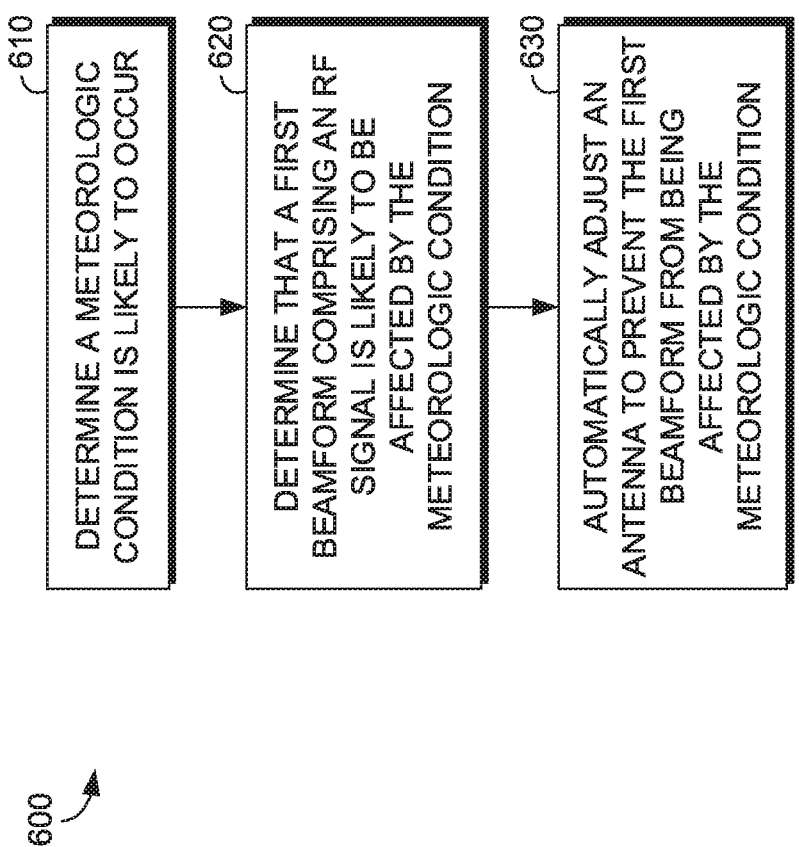
FIG. 6 depicts a block diagram of an exemplary method of mitigating the effects of a meteorologic event on the propagation of an RF signal, in accordance with an embodiment of the present technology.

Turning now to FIG. 6, an exemplary method 600 for mitigating the effects of meteorologic conditions on the propagation of an RF signal is presented. At step 610, a meteorologic condition is determined to be likely to occur at a specific time in the future T+1. The determination of step 610 may be based on receiving an indication from an external source that a meteorologic condition is likely to occur or have an "onset" at a particular place, at a particular time. In other aspects, step 610 may comprise receiving information or indications, such as surface observations, from network or external sensors. Such sensors may comprise an anemometer, a barometer, a thermometer, a wet bulb, or any other sensor or combination of sensors used to formulate a forecast of a meteorologic condition at some time in the future. In another aspect, a meteorologic condition may be determined to exist at a time in the future based on observations of an existing meteorologic condition at a remote geographic location. By tracking the existing meteorologic condition from a first remote location to a second remote location, it may be determined that the meteorologic condition is tracking on a vector having a particular course (e.g., a direction, a linear or non-linear path) and a speed. Based on this vector, it may be determined that the meteorologic condition is likely to occur at a particular location at a specified future time.

At a second step 620, it is determined that the meteorologic condition is likely to affect the propagation of an RF signal, as explained previously. Such a determination may be made based on current and/or forecasted propagation patterns of the first RF signal, such as a first beamform. By comparing the actual and/or forecasted meteorologic condition with the first beamform, the method 600 may determine, using various factors, that the first beamform is likely to be affected by the forecasted meteorologic condition. Said determination may be based on a likelihood meeting or exceeding a threshold. For example, it may be determined that there is a 75% probability that the first beamform is likely to be affected by the forecasted meteorologic condition and a threshold for preventative action may be set at 65%. Because the likelihood of RF signal propagation interference exceeds the predefined threshold, it may be determined that the meteorologic condition is sufficiently likely to affect the propagation of the first RF signal according to the first beamform such that an adjustment to the first beamform is to be implemented to reduce or prevent the propagation.

In a third step 630, the first beamform is adapted to become a second beamform to prevent at least a portion of the first RF signal from being affected by the forecasted meteorologic condition. The first beamform is adapted to become the second beamform prior to the onset of the forecasted meteorologic condition at a base station or cell corresponding to the first beamform. The adaptation of the first beamform to become the second beamform may occur utilizing any one or more of the mechanical and/or electrical mitigation techniques described with respect to aspects herein. In one exemplary aspect, any one or more components of the base station may be instructed to vertically down tilt at least one antenna or the signal characteristics of the signal admitted therefrom. By vertically tilting the antenna downward, the portion of the first beamform that was determined to be likely affected by the forecasted meteorologic condition may be tilted downward and away from the meteorological condition, creating a second beamform. Because the second beamform does not comprise the offending portion of the first beamform, at least a portion of the first beamform avoids being affected by the forecasted meteorologic condition.

Many different arrangements of the various components depicted, as well as components not shown, are possible without departing from the scope of the claims herein. Embodiments of the technology have been described with the intent to be illustrative rather than restrictive. Alternative embodiments will become apparent to readers of this disclosure after and because of reading it. Alternative methods of implementing the aforementioned subject matter may be performed without departing from the scope of the claims herein. Certain features and sub-combinations are of utility and may be employed without reference to other features and sub-combinations, which is contemplated as within the scope of the claims.

What is claimed is:

1. A system comprising:
   a first base station comprising a first antenna;
   a first antenna adjusting component, the first antenna adjusting component configured to adjust a vertical tilt of the first antenna;
   a second antenna;
   a second antenna adjusting component, the second antenna adjusting component configured to adjust the second antenna; and
   a processor, the processor configured to perform operations comprising:
   determining that a meteorologic condition is likely to occur and that a first beamform comprising an RF signal, radiated by the first antenna in a first orientation, is likely to be propagated by the meteorologic condition beyond a predetermined range;
   in response to the determination, automatically adjusting, using the first antenna adjusting component, the first antenna to a second orientation to reduce a likelihood of the first beamform being propagated by the meteorologic condition beyond the predetermined range;
   determining that a coverage gap is created as a result of the automatic adjustment of the first antenna; and
   automatically adjusting, using the second antenna adjusting component, the second antenna to a third orientation, wherein a second beamform radiated by the second antenna recaptures at least a portion of the coverage gap.

2. The system of claim 1, wherein the meteorologic condition is at least one tropospheric duct.

3. The system of claim 1, wherein the meteorologic condition is at least one inversion layer in proximity to a body of water, the RF signal being reflected or refracted skyward from the body of water and being reflected groundward by the at least one inversion layer.

4. The system of claim 1, wherein the processor is further configured to perform operations comprising:
   determining a time when the meteorologic condition is predicted to no longer affect the propagation of the RF signal radiated from the first antenna; and
   automatically restoring, using the first antenna adjusting component, the first antenna to the first orientation.

5. The system of claim 1, wherein the second antenna is located at the first base station.

6. The system of claim 1, wherein the second antenna is located at a second base station.

7. The system of claim 1, wherein the automatic adjusting using the first antenna adjusting component comprises vertically tilting the first antenna in an E plane, modifying a pitch of the first antenna.

8. The system of claim 1, wherein the automatic adjusting using the first antenna adjusting component comprises horizontally steering the first antenna in an H plane, modifying an azimuth of the first antenna.

9. The system of claim 1, wherein the meteorologic condition is determined to be likely to occur based on changes to meteorologic observations, the meteorologic observations comprising at least one surface condition and at least one atmospheric condition.

10. The system of claim 9, wherein the at least one surface condition comprises one or more of a surface temperature, dew point, surface wind, surface barometric pressure, or frontal zones, and wherein the at least one atmospheric condition comprises one or more of temperature aloft, humidity aloft, wind aloft, or barometric pressure aloft.

11. The system of claim 1, wherein the meteorologic condition is determined to be likely to occur based on receiving a tropospheric ducting forecast.

12. The system of claim 1, wherein the meteorologic condition is determined to be likely to occur based on forecasting a vector created from tracking movement of the meteorologic condition from a first location to a second location.

13. A method for mitigating the effects of a meteorologic condition on the propagation of a RF signal, the method comprising:
   determining that the meteorologic condition is likely to occur;

determining that a first beamform comprising the RF signal, radiated by a first antenna in a first orientation, is likely to be propagated by the meteorologic condition beyond a predetermined range;

automatically adjusting the first antenna to a second orientation to prevent at least a portion of the first beamform from being propagated by the meteorologic condition beyond the predetermined range;

determining that a coverage gap is created as a result of the automatic adjustment of the first antenna; and automatically adjusting, using a second antenna adjusting component, the second antenna to a third orientation, wherein a second beamform radiated by the second antenna recaptures at least a portion of the coverage gap.

14. The method of claim 13, wherein the meteorologic condition comprises a tropospheric duct.

15. The method of claim 13, wherein the determination that the meteorologic condition is likely to occur is based on at least one of a surface observation and an atmospheric observation.

16. One or more non-transitory computer-readable media having computer-executable instructions embodied thereon that, when executed, perform a method for mitigating the effects of a meteorologic condition on the propagation of a RF signal, the method comprising:

determining that the meteorologic condition is likely to occur and that a first beamform comprising the RF signal, radiated by the first antenna in a first orientation, is likely to be propagated by the meteorologic condition beyond a predetermined range;

in response to the determination, automatically adjusting, using a first antenna adjusting component, the first antenna to a second orientation to prevent at least a portion of the first beamform from being propagated by the meteorologic condition beyond the predetermined range;

determining that a coverage gap is created as a result of the automatic adjustment of the first antenna; and automatically adjusting, using a second antenna adjusting component, the second antenna to a third orientation, wherein a second beamform radiated by the second antenna recaptures at least a portion of the coverage gap.

17. The non-transitory computer-readable media of claim 16, wherein the meteorologic condition comprises a tropospheric duct.

18. The non-transitory computer-readable media of claim 16, wherein the meteorologic condition comprises an inversion layer located at least partially over a body of water.

* * * * *